United States Patent [19]
Tobias

[11] Patent Number: 5,168,703
[45] Date of Patent: Dec. 8, 1992

[54] CONTINUOUSLY ACTIVE PRESSURE ACCUMULATOR POWER TRANSFER SYSTEM

[76] Inventor: Jaromir Tobias, 322 East 57th St., New York, N.Y. 10022

[21] Appl. No.: 463,259

[22] Filed: Jan. 9, 1990

Related U.S. Application Data

[63] Continuation-in-part of Ser. No. 381,197, Jul. 18, 1989, and a continuation-in-part of Ser. No. 414,254, Sep. 29, 1989.

[51] Int. Cl.⁵ .................. F16D 31/02; F25B 1/047; B60K 17/00
[52] U.S. Cl. .................. 60/418; 60/452; 60/484; 60/494; 60/180; 60/306
[58] Field of Search ............. 60/418, 413, 415, 417, 60/418, 420, 422, 469, 484; 180/306, 53.8, 305, 308, 307

[56] References Cited

U.S. PATENT DOCUMENTS

| | | |
|---|---|---|
| 900,342 | 10/1908 | Ashley . |
| 1,216,761 | 2/1917 | York . |
| 1,987,698 | 1/1935 | Montelius . |
| 1,991,579 | 2/1935 | Sampson . |
| 2,100,404 | 11/1937 | Mason et al. . |
| 2,239,612 | 6/1938 | Lawlor . |
| 2,240,011 | 11/1939 | Casey . |
| 2,326,821 | 8/1943 | Boyle ................. 60/418 |
| 2,355,357 | 8/1944 | Adams et al. . |
| 2,363,977 | 11/1944 | Kucher ................. 180/306 |
| 2,396,653 | 3/1945 | Hermanny . |
| 2,704,131 | 3/1955 | Vahs ................. 180/306 |
| 2,727,470 | 12/1955 | Ludwig . |
| 2,846,850 | 8/1958 | Hall ................. 60/418 |
| 2,850,869 | 9/1958 | Forster ................. 60/415 X |
| 2,850,878 | 9/1958 | Sampietro et al. ......... 60/418 |
| 3,023,579 | 3/1962 | Bookout et al. .......... 60/418 |
| 3,157,202 | 11/1964 | Sadler et al. . |
| 3,169,551 | 2/1965 | Lewis ................. 138/26 |
| 3,281,101 | 10/1966 | May . |
| 3,283,165 | 11/1966 | Bloch ................. 290/4 R |
| 3,343,560 | 9/1967 | Nankivell . |
| 3,459,395 | 8/1969 | Scotto . |
| 3,478,513 | 11/1969 | Ma et al. . |
| 3,513,929 | 5/1970 | Kim ................. 60/415 X |

(List continued on next page.)

FOREIGN PATENT DOCUMENTS

| 3543-073-A | of 0000 | Fed. Rep. of Germany . |
| 10171 | 1/1980 | Japan ................. 60/418 |

OTHER PUBLICATIONS

Auto Engines and Electrical Systems, 6th Ed., by Harold F. Blanchard, S.A.E. and Ralph Ritchen, S.A.E. published by MOTOR, New York, N.Y., 1973.
Society of Automotive Engineers, Apr. 1959, "Coming Central Hydraulics", pp. 26–31.

Primary Examiner—Edward K. Look
Assistant Examiner—John Ryznic
Attorney, Agent, or Firm—Antonelli, Terry Stout & Kraus

[57] ABSTRACT

A continuously active pressure accumulator power transfer system for a vehicle or a like comprises an engine, a pump driven by the engine, a main pressure accumulator maintained at a substantially constant fluid pressure and fluid volume by the pump during operation, a fluid motor for propelling the vehicle which is supplied with driving fluid pressure from the pressure accumulator and auxiliary units for operating the vehicle. The auxiliary units are also operated by fluid pressure from the pressure accumulator. The fluid motor(s) and the auxiliary units are operated directly by fluid pressure from the accumulator without any direct connection with the engine.

21 Claims, 2 Drawing Sheets

U.S. PATENT DOCUMENTS

| | | | |
|---|---|---|---|
| 3,587,233 | 6/1970 | Fischbach | 60/418 X |
| 3,669,150 | 7/1972 | Everett . | |
| 3,690,607 | 9/1972 | Mard . | |
| 3,744,517 | 7/1973 | Mercier | 138/30 |
| 3,784,146 | 1/1974 | Matthews . | |
| 3,828,555 | 8/1974 | Capdevielle | 60/413 |
| 3,886,848 | 6/1975 | Budecker et al. | 60/418 X |
| 3,891,045 | 6/1975 | Pancella | 180/306 X |
| 3,892,283 | 7/1975 | Johnson | 60/413 X |
| 3,918,847 | 11/1975 | Junck et al. | 60/418 X |
| 3,957,128 | 5/1976 | LeSalver et al. . | |
| 3,962,872 | 6/1976 | Budzich . | |
| 3,964,260 | 6/1976 | Williams et al. | 60/413 |
| 3,984,978 | 10/1976 | Alderson | 180/306 X |
| 4,011,722 | 3/1977 | Drake . | |
| 4,057,073 | 11/1977 | Adams | 60/422 X |
| 4,064,694 | 12/1977 | Baudoin | 60/413 |
| 4,215,545 | 8/1980 | Morello et al. | 60/413 |
| 4,227,587 | 10/1980 | Carman | 60/414 X |
| 4,236,595 | 12/1980 | Beck et al. . | |
| 4,240,515 | 12/1980 | Kirkwood | 60/413 X |
| 4,246,978 | 1/1981 | Schulz et al. | 60/414 X |
| 4,348,863 | 9/1982 | Taylor et al. | 60/413 X |
| 4,350,220 | 9/1982 | Carman | 60/414 X |
| 4,370,714 | 1/1983 | Rettich et al. | 91/429 X |
| 4,407,330 | 10/1983 | Fujiwara | 138/30 |
| 4,503,928 | 3/1985 | Mallen-Herrero et al. . | |
| 4,514,151 | 4/1985 | Anders et al. . | |
| 4,527,954 | 7/1985 | Murali et al. . | |
| 4,553,744 | 11/1985 | Konishi et al. . | |
| 4,557,678 | 12/1985 | Nishimura . | |
| 4,627,239 | 12/1986 | Nishimune et al. | 60/484 |
| 4,712,376 | 12/1987 | Hadank et al. | 60/484 X |
| 4,735,296 | 4/1988 | Pinson . | |
| 4,741,247 | 5/1988 | Glomeau et al. | 60/413 X |
| 4,741,410 | 3/1988 | Tunmore . | |
| 4,745,745 | 5/1988 | Hagin | 60/413 X |
| 4,752,195 | 6/1988 | Friedrich et al. . | |
| 4,754,603 | 7/1988 | Rosman | 60/415 |
| 4,762,306 | 8/1988 | Watanabe et asl. . | |
| 4,769,989 | 9/1988 | Ostwald et al. | 60/418 X |
| 4,788,949 | 12/1988 | Best et al. . | |
| 4,801,245 | 1/1989 | DeHaas et al. . | |
| 4,813,234 | 3/1989 | Nikolaus . | |
| 4,838,316 | 6/1989 | Sugimura | 138/30 |
| 4,856,264 | 8/1989 | Nishimura et al. . | |
| 4,858,898 | 8/1989 | Niikura et al. . | |
| 4,872,486 | 10/1989 | Sugimura et al. | 138/30 |
| 4,888,949 | 12/1989 | Rogers | 60/434 |
| 4,903,792 | 2/1990 | Ze-Ying . | |
| 5,036,879 | 8/1991 | Ponci . | |
| 5,062,498 | 11/1991 | Tobias | 60/418 X |

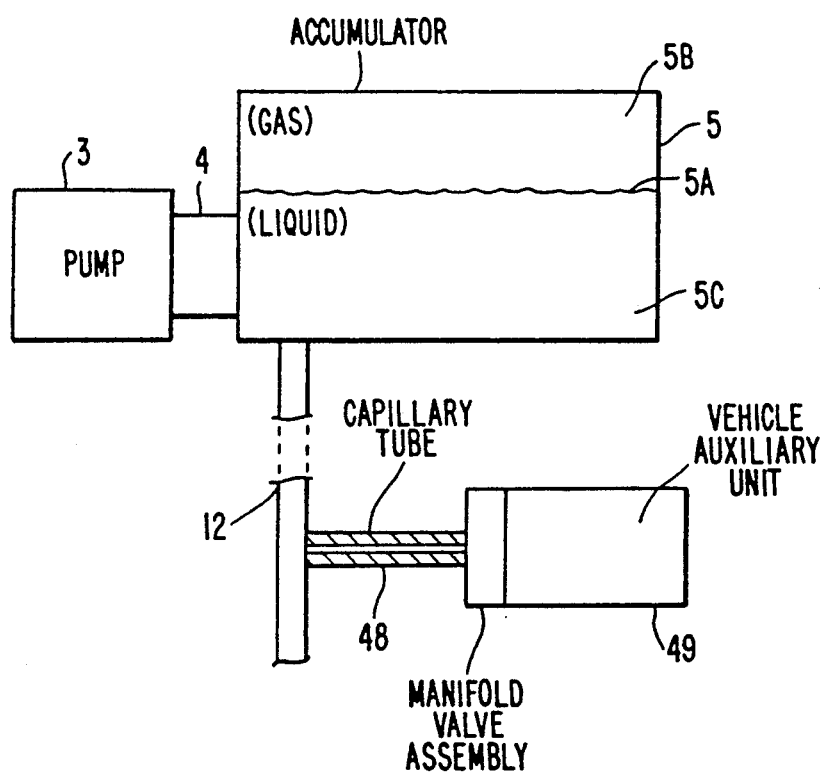

CONTINUOUSLY ACTIVE PRESSURE ACCUMULATOR POWER TRANSFER SYSTEM

REFERENCE TO RELATED APPLICATIONS

This is a continuation in part application of my two prior pending patent applications, U.S. application Ser. No. 381,197 filed Jul. 18, 1989, for an invention titled HYDROSTATIC POWER TRANSFER SYSTEM, now U.S. Pat. No. 5,062,498 issued Nov. 5, 1991, and U.S. application Ser. No. 414,254 filed Sep. 29, 1989, for an invention titled ACTIVE ACCUMULATOR VIBRATION ABSORBING SUPPORT SYSTEM, now U.S. Pat. No. 5,050,835 issued Sep. 24, 1991.

TECHNICAL FIELD

This invention relates to a power transfer system for vehicles. My application Ser. No. 381,197 relates to a hydrostatic power transfer system which utilizes an active pressure accumulator interposed between the vehicle engine and hydraulic drive motor(s) for the drive wheels of the vehicle. This arrangement provides for an effective vibration isolation of the vehicle engine and pump driven thereby from the hydraulic motors for the vehicle drive wheels.

My prior application Ser. No. 414,254 relates to the use of a pressure accumulator for supplying fluid pressure for active vibration isolation mounts, such as engine mounts and the like.

The present invention is directed toward improving upon the systems of my above two mentioned prior applications, including utilization of an active pressure accumulator for additional functions on a vehicle.

BACKGROUND ART

In typical motor vehicle operations, the vehicle engine must drive many auxiliary systems in addition to providing power to the power train which eventually drives the propelling wheels of the vehicle. For example, with water cooled engines, a water pump is connected by a belt or chain drive to the engine crankshaft. Additionally, the engine oil lubrication system pump is driven directly from the vehicle engine. Further, an electric power generator is powered by the engine with a chain or belt drive connection to the engine crankshaft. Other auxiliary systems that are powered by the vehicle engine include ABS braking systems, air conditioner compressors, and windshield wiper driver motor systems and other auxiliary systems.

The driving connection of these auxiliary systems to the vehicle engine, all require some type of mechanical drive train connection between the engine crankshaft and the auxiliary system pump or motor. Each of these drive trains involve energy losses in the engine and units of the drive trains and also provide for the transfer of torque, pulsations, and vibration, between the engine and the auxiliary system pump(s) or motor(s) being driven thereby. Such torque, vibration, and noise transfer in the drive trains between the engine and the auxiliary systems may result in bearing wear problems and generate vibrations which are transferred not only to the engine and the auxiliary systems, but also to the vehicle frame, causing vehicle noise problems, as well as wear problems on the entire vehicle system. Furthermore, since the auxiliary systems operate with varying load demands on the engine such as caused by the switching on and off of a vehicle air conditioning compressor drive motor in response to the air conditioning needs of the vehicle, there are frequently occurring transient start-up and shut-down phases for each of the auxiliary systems, which when they coincide with one another, cause major fluctuations in required engine torque as well as in torque feedback to the engine from the auxiliary systems.

Furthermore, the varying loads imposed by the operation of the auxiliary systems necessarily require varying engine torque output demands on the engine, thereby requiring the engine to operate over a range of different speed and torque values. Optimum engine efficiency may be realistically designed for only a very narrow engine speed and torque range. Such fluctuating loads inherently adversely affect the vehicle engine operating efficiency due to the requirement to design the engine to operate over wide engine speed and torque ranges.

DISCLOSURE OF INVENTION

An object of the invention is to provide improved power transfer systems for vehicles which provide for the smooth and efficient operation of vehicle auxiliary devices, while minimizing wear and tear on the vehicle engines. This and other objects are achieved according to preferred embodiments of the present invention by providing that, rather than coupling the auxiliary systems to the engine directly, they are driven by fluid pressure from a hydraulic fluid accumulator, which accumulator in turn is maintained as a continuously active accumulator at a constant required pressure by means of a pump driven by the engine. In especially preferred embodiments, the pump and engine are designed so as to provide the maximum required accumulator pressure and volume, with the consequence that the engine and pump can be designed to operate very efficiently over a desired narrow speed and torque range. A microprocessor control unit is provided for controlling a manifold valve interposed between the pump and the active accumulator so as to maintain the desired pressure in the accumulator system. The auxiliary system motor(s) and pump(s), such as the water pump, oil pump, air conditioner compressor motor, and the like are all driven by the fluid pressure from the active accumulator but with the control unit operating to control manifold valves interposed between the accumulator and each of these respective auxiliary drive motors and pumps.

In certain preferred embodiments, where the pressure required for the auxiliary system is substantially lower than the maximum pressure maintained in the main accumulator, capillary tubes are interposed so as to provide automatically for a pressure reduction between the auxiliary system and the main pressure accumulator.

In especially preferred embodiments, the control unit is provided with auxiliary system operating condition signals representative of the auxiliary system hydraulic pressure power needs, and the control unit then controls the manifold valve between the main accumulator and the respective auxiliary unit to provide the desired fluid pressure and fluid volume.

In certain preferred embodiments, the engine or other power source is permanently connected to the main pump via a shaft or constant velocity universal joint, such that no shiftable transmission is required between the engine and the main pump, thereby providing for a smooth, quiet, hesitation-free drive of the pump. The interposition of the constantly active accumulator between the vehicle engine and pump driven thereby, on the one hand, and the wheel drive systems and the auxiliary systems, on the other hand, effectively isolates the transfer of any vibrations, torque and noise between the engine and pump and these drive systems and auxiliary systems. Since the main pressure accumulator is maintained at substantially constant pressure and acts as a "source" of fluid pressure for all of the connected vehicle wheel drive systems and auxiliary systems, there is minimal fluid flow velocity within the main accumulator. Thus the accumulator can be constructed of various shapes so as to accommodate space considerations within the vehicle environment. Further, since the mechanical drive train connections between the engine crankshaft and the auxiliary systems are eliminated, the entire auxiliary drive system can be readily designed to fit into the available vehicle space. Utilization of the present invention in a motor vehicle results in quiet running, hesitation free operations of the vehicle wheel driver and the drive trains for all auxiliary systems. That is, by interposing the main constantly active accumulator (and using valves and the microprocessor to control the operation of the accumulator) between the engine-pump and the rest of the drive train and auxiliary serving units of the vehicle, the vibration, torque, pulsation and noise of the engine, pump and auxiliary units are effectively prevented from being transported to the chassis and cab of the vehicle. This enables a smooth, quiet and far more efficient operation of the total vehicle as compared with known systems.

Other objects, advantages and novel features of the present invention will become apparent from the following detailed description of the invention when considered in conjunction with the accompanying drawings.

BRIEF DESCRIPTION OF DRAWINGS

FIG. 2 is a schematic view of a portion of power transfer system like that in FIG. 1 showing a capillary tube between the accumulator and an auxiliary unit for reducing pressure.

BEST MODE FOR CARRYING OUT THE INVENTION

Figure 1:
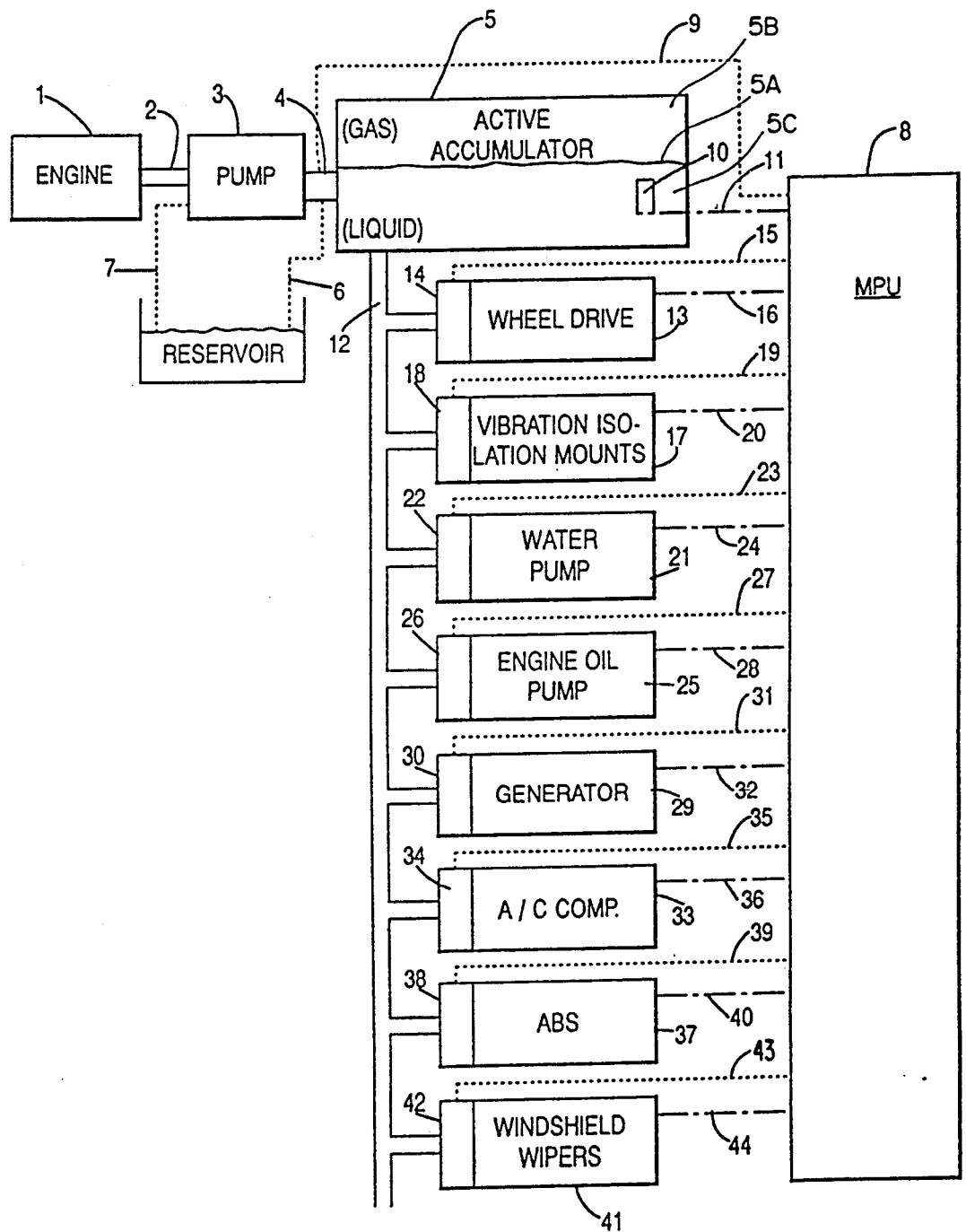
FIG. 1 is a schematic view depicting the continuously active pressure accumulator power transfer system construction according to a preferred embodiment of the present invention.

FIG. 1 schematically depicts a continuously active pressure accumulator power transfer system constructed according to a preferred embodiment of the present invention. Referring to FIG. 1, a vehicle engine 1 is provided which includes a rotatable output shaft 2 drivingly connected to pump 3. Pump 3 has its outlet connected to a control valve manifold 4 which controls the supply of pressurized hydraulic fluid to an inlet of a main active accumulator 5 in communication with chamber 5C of the accumulator and bypassing the accumulator to a reservoir by way of line 6 as shown in FIG. 1. Lines 6 and 7 represent return lines to and from a fluid system reservoir. The pressurized fluid in chamber 5C of the active accumulator 5 is maintained at a substantially constant pressure by an essentially constant velocity running engine 1 and pump 3. For this purpose, the microprocessor unit 8 is provided which includes an output control signal line 9 controlling the manifold valve 4 as a function of the pressure sensed by pressure sensor 10 in the chamber 5C of the accumulator and the pressure signal line 11. At least a substantial portion of the fluid in chamber 5B of the accumulator 5 is a pressurized gas which, because of its elastic properties, acts as a shock and vibration absorber for the whole drive to avoid jerks as discussed below.

The pressurized hydraulic fluid in chamber 5C of the active accumulator 5 is continuously communicated via main pressure output line 12, extending from an outlet of the accumulator, with a plurality of vehicle auxiliary units described below, as well as the vehicle wheel drive units 13. The wheel drive units 13 are controlled by the schematically shown manifold valve assemblies 14, controlled by the microprocessor line 15 as a function of the detected and desired wheel drive condition via detection line 16. The operation of the vehicle wheel drive unit 13 is described in detail in my co-pending application Ser. No. 381,197 the disclosure of which is hereby incorporated by reference. The wheel drive units 13 could also be operated in a conventional manner.

As illustrated in FIG. 1 and as disclosed in my co-pending U.S. application Ser. No. 07/381,197, the pressure accumulator 5 is arranged in series between the pump 3, on the one hand, and the wheel drive units 13 as well as each of the vehicle auxiliary units described below, on the other hand. That is, the accumulator has an inlet for accepting pressurized fluid into chamber 5C of the accumulator from the pump 3 by way of the control valve manifold 4, and an outlet for providing pressurized fluid from the chamber 5C of the accumulator to the main output line 12 which in turn supplies pressurized fluid to the wheel drive units 13 and the vehicle auxiliary units. The accumulator 5 includes a flexible diaphragm 5A separating two chambers 5C and 5B. The diaphragm 5A and pressurized gas in chamber 5B act as an effective "spring cushion", e.g. a shock and vibration absorber as noted above, for the pressure of the driving fluid in chamber 5C. In this way the accumulator effectively isolates the pump 3 from the wheel drive units 13 and each of the vehicle auxiliary units so that the transmission of vibration forces through the system from the pump 3 to the fluid drive units 13 and the vehicle auxiliary units, and vice versa, is effectively minimized. The accumulator 5 substantially eliminates the transmission of vibrations from the engine 1 and pump 3, on the one hand, to the vehicle wheel units 13 and vehicle auxiliary units, on the other hand, and vice versa.

The first shown auxiliary vehicle unit 17 is a vibration isolation mount system of the type disclosed in my prior application Ser. No. 414,254. The vibration isolation mounts 17 have their fluid supply controlled by the manifold valve assembly 18 and the control line 19 from the microprocessor 8, which operates in response to the detected vibration isolation mount conditions via detection line 20. The disclosure of my prior application Ser. No. 414,254 is hereby incorporated by reference. It is also envisioned that other, conventional fluid pressure operated vibration isolation mount systems and suspension systems could be employed.

The engine water pump 21 is connected with the accumulator 5 via line 12 and manifold valve 22, which manifold valve is controlled via control line 23 in response to detected water pump need conditions via line 24.

The engine oil pump 25 is operatively driven by the fluid pressure from the accumulator 5 via line 12 and manifold valve assembly 26, which is controlled via control line 27 in response to detected desired oil pump conditions transmitted via line 28.

The vehicle electric generator 29 is driven via the fluid pressure from the accumulator 5 via the main pressure line 12 and the manifold valve assembly 30, which valve assembly 30 is controlled by control line 31 from the microprocessor unit 8 based upon detected generator need conditions via line 32. Some or all of the electrical units of the vehicle can be electrically powered by the generator.

The air conditioner compressor motor 33 is also driven via the fluid pressure from accumulator 5 via line 12 and manifold valve assembly 34, which valve assembly 34 is controlled via control line 35 from the microprocessing unit 8 in response to the detected and desired condition via line 36.

The ABS brakes system 37 is supplied with operating hydraulic fluid pressure via the accumulator line 12 and manifold valve assembly 38, controlled by line 39 from the microprocessing unit 8 in response to the detected need requirements via line 40. It should be understood that an interface piston cylinder connection will be utilized in the ABS pressurizing system whenever the fluid in the ABS system is different than the active accumulator fluid.

The windshield wiper drive motor system 41 is also powered by the fluid pressure in line 12 via manifold valve assembly 42, in turn controlled by the microprocessing unit 8 in response to the detected desired condition via lines 43 and 44, respectively. It should be understood that the suitably programmed microprocessing unit 8 will cooperate together with any manual controls and/or other automatic controls for controlling the windshield wiper operation, the drawing really depicting the supply of pressurized fluid for the windshield wiper motor. Thus, the water pump 21, oil pump 25, electric generator 29, AC compressor motor 33, ABS brake system 37 and windshield drive motor system 41 are each driven, for operation in a conventional manner, by pressurized fluid from the accumulator 5 via main pressure line 12 under the control of their respective manifold valve assemblies by the programmed microprocessing unit 8.

Although the preferred embodiment illustrated and described relates to a vehicle with a wheel drive system, it should be understood that the invention could also be implemented in conjunction with a boat, where the boat propeller drive would be substituted for the wheel drive 13. Other vehicle arrangements such as air craft and the like could also utilize the present invention according to preferred embodiments thereof.

Further, although vehicle environments have been described in conjunction with the preferred embodiment illustrated, the invention could also be used for certain stationary non-vehicle environments wherein similar requirements are needed for driving a plurality of auxiliary devices which exhibit varying loads on the system during operation. Also, the auxiliary vehicle units powered by pressurized fluid from the accumulator 5 could include other types of units than those shown and described, such as a small turbine or a high pressure pump whose output is in turn used to drive one or more auxiliary units.

In the case the pressure required for the auxiliary system is substantially lower than the maximum pressure maintained in the main accumulator, capillary tubes are interposed so as to provide automatically for a pressure reduction between the auxiliary systems and the main pressure accumulator. Such an arrangement is schematically illustrated in FIG. 2 wherein a capillary tube 48 is provided between accumulator 5 and an auxiliary unit 49 for pressure reduction.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. A continuously active pressure accumulator power transfer system for a vehicle or the like comprising:

engine means, hydraulic fluid pump means driven by the engine means, a main pressure accumulator disposed downstream of the pump means and having respective accumulator inlet means for accepting pressurized hydraulic fluid from the pump means and accumulator outlet means for discharging hydraulic fluid under pressure from the accumulator, means for maintaining the hydraulic fluid in the accumulator at a substantially constant fluid pressure and fluid volume during operation of the system, said accumulator including two chambers separated by a flexible diaphragm, pressurized hydraulic fluid from the pump means being supplied to one of the two chambers and the other chamber including a pressurized gas for acting against said pressurized hydraulic fluid in said one chamber via said flexible diaphragm for continuously acting as a vibration absorber against vibration transmission through the accumulator during operation of the system, fluid motor means for propelling the vehicle, said fluid motor means being disposed downstream of the accumulator and supplied with driving fluid pressure from the accumulator outlet means, and auxiliary means for operating said vehicle, said auxiliary means being disposed downstream of the accumulator and operated by fluid pressure from the accumulator outlet means, whereby said pressure accumulator is interposed in series between said fluid pump means and the fluid motor means and between said fluid pump means and said auxiliary means, and wherein the fluid motor means and the auxiliary means are operated directly by fluid pressure from the accumulator without any direct connection with the engine means, and wherein said means for maintaining includes accumulator inlet valve means interposed between the pump means and the accumulator for controlling the flow of pressurized hydraulic fluid from the pump means to the accumulator and from the pump means bypassing the accumulator to a reservoir and microprocessor control means for controlling the accumulator inlet valve means as a function of the hydraulic fluid pressure in the accumulator for maintaining the accumulator at the substantially constant fluid pressure and fluid volume during both operation and nonoperation of said fluid motor means while the system is operating.

2. A continuously active pressure accumulator power transfer system according to claim 1, wherein the auxiliary means includes an engine cooling water pump for cooling the engine.

3. A continuously active pressure accumulator power transfer system according to claim 1, wherein the auxiliary means includes an engine oil pump for providing lubricating oil to the engine.

4. A continuously active pressure accumulator power transfer system according to claim 1, wherein the auxiliary means includes an electrical generator supplying electric power to the vehicle.

5. A continuously active pressure accumulator power transfer system according to claim 1, wherein the auxiliary means includes a vehicle air conditioning compressor drive motor.

6. A continuously active pressure accumulator power transfer system according to claim 1, wherein the auxiliary means includes a pressurizing system for a vehicle ABS system.

7. A continuously active pressure accumulator power transfer system according to claim 1, wherein the auxiliary means includes a windshield wiper drive motor means.

8. A continuously active pressure accumulator power transfer system according to claim 1, wherein the auxiliary means includes a vibration isolation mount system.

9. A continuously active pressure accumulator power transfer system according to claim 1, wherein accumulator fluid control pressure supply means are interposed between the main pressure accumulator and each of the respective auxiliary means, and wherein said control unit includes means for controlling the respective accumulator pressure supply control means as a function of detected pressure supply needs at the respective auxiliary means.

10. A continuously active pressure accumulator power transfer system according to claim 9, wherein the accumulator fluid pressure control supply means includes at least one capillary supply tube which substantially reduces the fluid pressure from the main accumulator pressure to at least one of the auxiliary means.

11. A hydrostatic power transfer system for a vehicle or the like comprising:
a source of motive power,
a pressure accumulator,
fluid pump means driven by motive power from said source of motive power for supplying pressurized hydraulic fluid to said pressure accumulator,
said pressure accumulator being disposed downstream of the pump means and having respective accumulator inlet means for accepting pressurized hydraulic fluid from the fluid pump means and accumulator outlet means for discharging hydraulic fluid under pressure from the accumulator, said accumulator including first and second chambers and flexible pressure transmissive means separating said first and second chambers, the pressurized hydraulic fluid from said fluid pump means being supplied to said first chamber via said accumulator inlet means and said second chamber including a pressurized gas as spring cushion means for acting against said pressurizing hydraulic fluid in said first chamber via said flexible pressure transmissive means for continuously acting as a vibration absorber against vibration transmission through the accumulator during operation of the system,
fluid motor means downstream of the pressure accumulator and driven by hydraulic fluid from said first chamber of the accumulator via the accumulator outlet means for propelling the vehicle,
auxiliary means downstream of the pressure accumulator and driven by fluid from said first chamber of the accumulator via the accumulator outlet means for operating said vehicle, whereby said pressure accumulator is interposed in series between said fluid pump means and the fluid motor means and between said fluid pump means and said auxiliary means so that it substantially eliminates transmission of vibrations from the fluid pump means to the fluid motor means and the auxiliary means, and
accumulator inlet valve means interposed between the pump means and the accumulator for controlling the flow of pressurized hydraulic fluid from the pump means to the accumulator and from the pump means bypassing the accumulator to a reservoir, and microprocessor control means for controlling the accumulator inlet valve means as a function of the hydraulic fluid pressure in the accumulator for maintaining the hydraulic fluid pressure in the accumulator at a substantially constant pressure during both operation and nonoperation of said fluid motor means while the system is operating.

12. A power transfer system according to claim 11, wherein said auxiliary means includes means for supplying electric power to the vehicle.

13. A power transfer system according to claim 12, wherein said means for supplying electric power to the vehicle is an electric generator.

14. A power transfer system according to claim 11, wherein said auxiliary means includes an engine cooling water pump for cooling the engine.

15. A power transfer system according to claim 11, wherein said auxiliary means includes an engine oil pump for providing lubricating oil to the engine.

16. A power transfer system according to claim 11, wherein said auxiliary means includes a vehicle air conditioning compressor drive motor.

17. A power transfer system according to claim 11, wherein said auxiliary means includes a pressurizing system for a vehicle ABS brake system.

18. A power transfer system according to claim 11, wherein said auxiliary means includes a windshield wiper drive motor means.

19. A power transfer system according to claim 11, wherein said auxiliary means includes a vibration isolation mount system.

20. A power transfer system according to claim 11, wherein accumulator fluid control pressure supply means are interposed between the pressure accumulator and each of a plurality of respective auxiliary means, and wherein said microprocessor control means includes means for controlling the respective accumulator fluid control pressure supply means as a function of detected pressure supply needs at the respective auxiliary means.

21. A power transfer system according to claim 20, wherein the accumulator fluid control pressure supply means includes at least one capillary supply tube which substantially reduces the fluid pressure from the accumulator to at least one of the auxiliary means.

* * * * *